Figure 1:
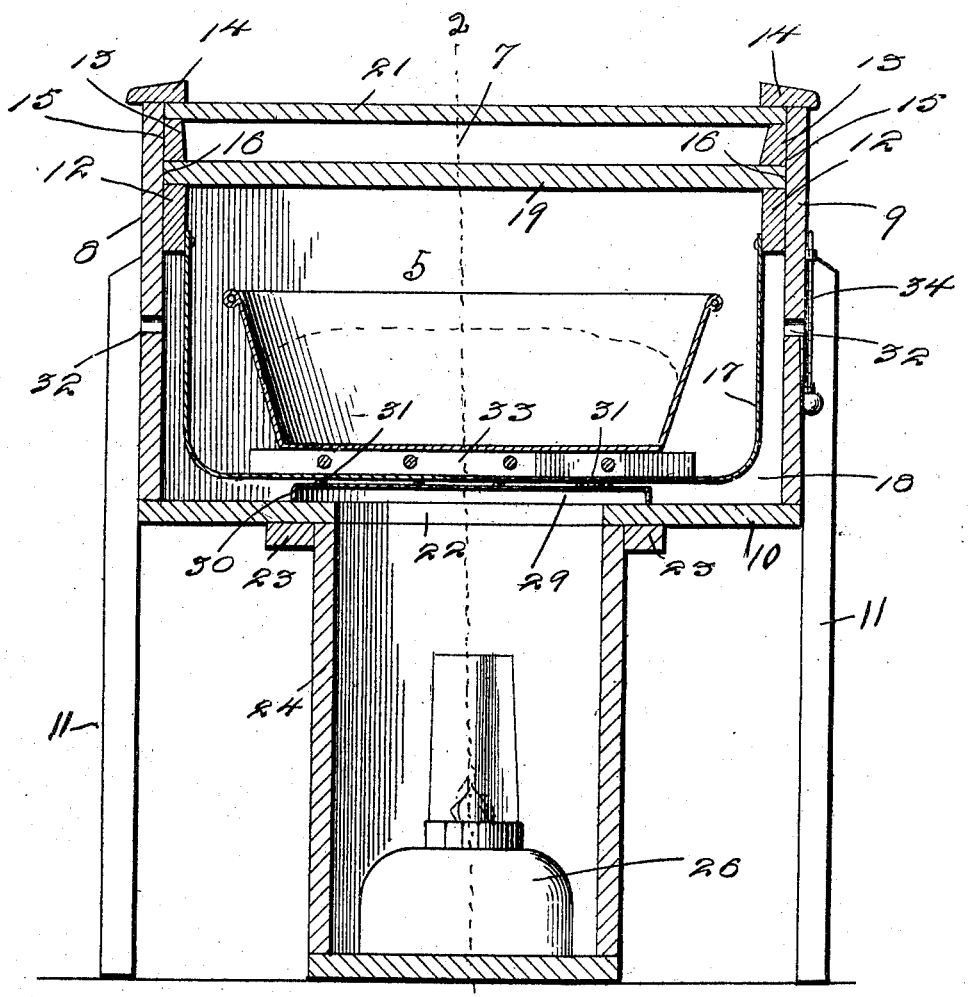

No. 776,395. PATENTED NOV. 29, 1904.
W. A. HECKEL.
DOUGH RAISER.
APPLICATION FILED AUG. 3, 1904.
NO MODEL. 2 SHEETS—SHEET 1.

Witnesses

Inventor
W. A. Heckel
By
Attorneys

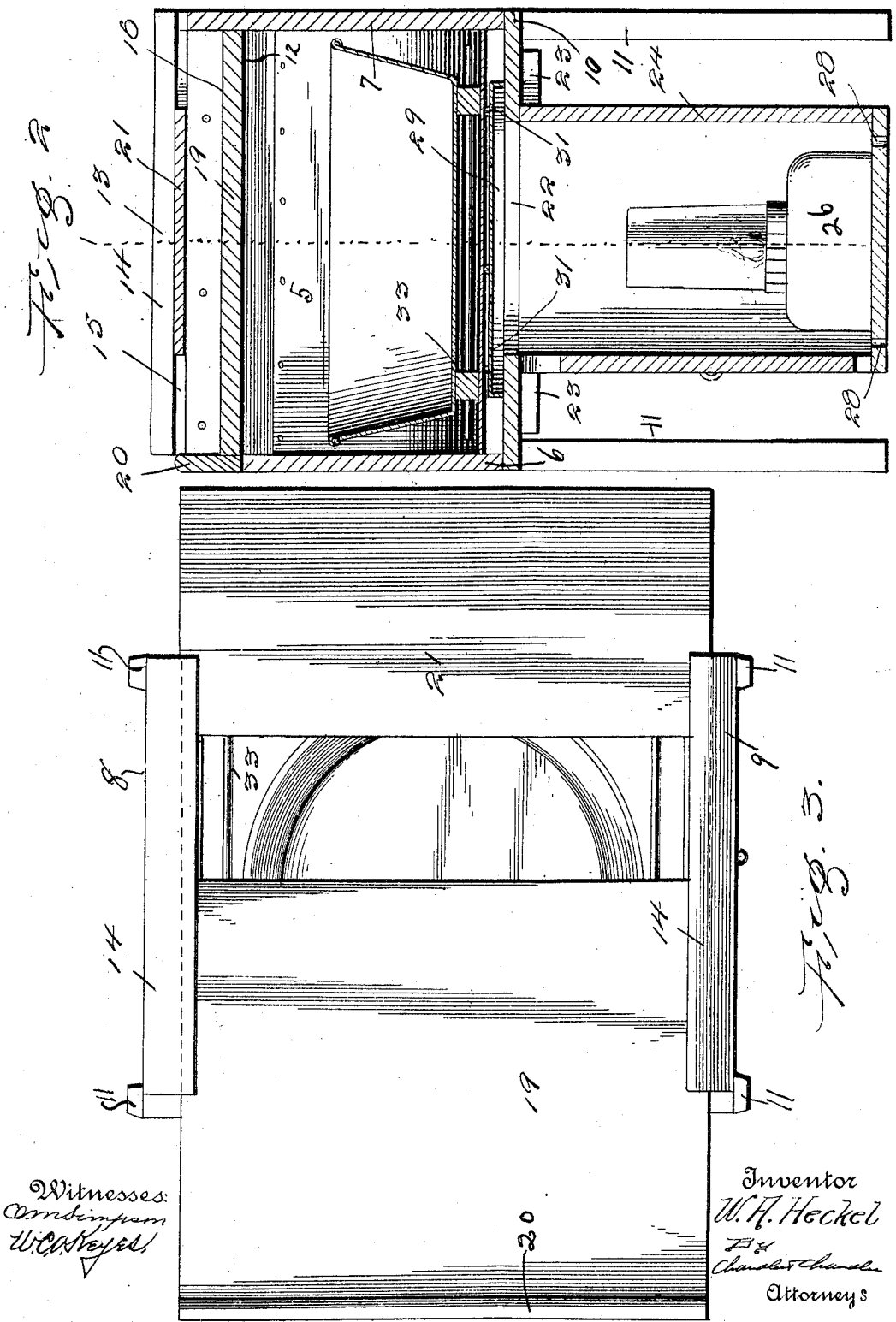

No. 776,395. Patented November 29, 1904.

UNITED STATES PATENT OFFICE.

WILHELMIENE A. HECKEL, OF PRESCOTT, WISCONSIN.

DOUGH-RAISER.

SPECIFICATION forming part of Letters Patent No. 776,395, dated November 29, 1904.

Application filed August 3, 1904. Serial No. 219,352. (No model.)

*To all whom it may concern:*

Be it known that I, WILHELMIENE A. HECKEL, a citizen of the United States, residing at Prescott, in the county of Pierce, State of Wisconsin, have invented certain new and useful Improvements in Dough-Raisers; and I do hereby declare the following to be a full, clear, and exact description of the invention, such as will enable others skilled in the art to which it appertains to make and use the same.

This invention relates to kitchen furniture, and more particularly to dough-raisers, and has for its object to provide a device of this nature in which the dough may be placed and which will keep the dough warm during fermentation.

A further object is to provide a dough-raiser which will also act as a kitchen-table and which will include a bread-board upon which the dough may be prepared, the arrangement being such that the bread-board will form a closure for the heating-chamber.

Other objects and advantages will be apparent from the following description, and it will be understood that modifications of the specific construction shown may be made, and any suitable materials may be used without departing from the spirit of the invention.

In the drawings forming a portion of this specification, and in which like numerals of reference indicate similar parts in the several views, Figure 1 is a vertical section on line 1 1 of Fig. 2. Fig. 2 is a vertical section at right angles to Fig. 1 on line 2 2 of Fig. 1. Fig. 3 is a top plan view.

Referring now to the drawings, the present invention comprises a body portion 5, including sides 6 and 7 and ends 8 and 9, the body portion being provided with a bottom 10 and having legs 11 by which it is supported and which are of a sufficient length to bring the top of the body portion to the height of an ordinary kitchen-table. The front side 6 of the body portion is somewhat lower than the ends 8 and 9 and the rearward side 7, so that the rearward side and the ends extend thereabove, the ends also extending slightly about the rearward side. Secured to the inner faces of the ends horizontally and lying flush with the upper edge of the forward side 6 are beads 12, and secured also to the inner faces of the ends are other beads 13, which lie with their lower edges spaced from the beads 12 and with their upper edges flush with the upper edge of the rearward side 7, and secured upon the upper edges of the ends 8 and 9 are boards 14, which extend slightly beyond the inner and outer faces of the ends and from side to side thereof. The inwardly-extending portions of the boards 14 are spaced from the beads 13, so that there are formed between these boards and the beads a pair of grooves 15, and similar grooves 16 are formed between the beads 13 and the beads 12.

Secured to the heads 12 are the ends of a metallic lining 17, which is spaced from the ends and bottom of the body portion and lies with its edges against the inner faces of the sides thereof, so that an air-space 18 is formed between this metallic lining and the ends and bottom of the body portion.

Slidably disposed with its edges in the grooves 16 is a bread-board 19, which is of a size to close the opening of the body portion and is slidable in the grooves into and out of position to close this opening. At its forward edge the board 19 has a board 20 secured thereto, which extends upwardly therefrom and which projects beyond the ends thereof, and when the bread-board is in position to close the body portion this board 20 lies flush with the forward side 6, forming a continuation and lying with its ends against the ends of the upwardly-extending portions of the ends 8 and 9 of the body portion and with its upper edge beneath the ends of the boards 14, which extend slightly beyond the forward sides of the ends 8 and 9, as shown.

Slidably disposed in the grooves 15 is a pan-rack 21, upon which the pans to receive the bread may be disposed when the bread-board is in use, and this pan-rack may be moved to bring the pans within easy reach of the user.

Formed through the bottom 10 is an opening 22, and secured to the under face of the bottom at the ends of this opening are slats 23, between which is secured a lamp-holder 24, which is in the form of a box and which is open at its top to communicate with the air-space 18 through the opening 22. Formed through the bottom of the lamp-holder are perforations 28 for the passage of air to the lamp.

Disposed above the opening 22 and spaced from the bottom 10 and from the metallic lining 17 is a circular plate 29, having a depending flange 30 at its edge which rests upon the bottom 10 and which holds the plate in spaced relation thereto. Adjacent to its edge the plate 29 is provided with a plurality of perforations 31 for the passage of heat from the lamp to the air-space 18, and by reason of the fact that the plate 29 is spaced from the metallic lining 17 the heat of the lamp is prevented from coming directly into contact therewith, and the heat is thus evenly distributed over the entire under surface of the lining, thus maintaining all portions of the bottom of the lining at an even temperature. It will thus be apparent that the heat from the lamp passes up through the opening 22 and the perforations 31 to the air-space 18 and passes upwardly around the ends of the metallic lining, after which it passes out through openings 32 in the ends 8 and 9, just below the beads 12.

Disposed within the body portion and upon the metallic lining is a rack 33 for the reception of the bread-pan containing the dough to be raised, and when the dough-raiser is in use the pans containing the dough are disposed upon the rack and the bread-board is moved into position to close the opening of the body portion, after which the lamp is lighted and is allowed to burn until the interior of the body portion is brought to the correct temperature. If desired, a thermometer 34 may be secured to the outer face of the body portion and may have its bulb passed through a perforation in one of the sides in order that the fluid within the thermometer may be acted upon by the heat of the body portion to indicate the temperature thereof. After the thermometer has risen to the correct temperature the lamp may be turned down and left burning just enough to maintain the temperature at the desired point.

What is claimed is—

1. A dough-raiser comprising a hollow body portion open at its top and including a bottom, sides and ends, said ends extending above one side, beads secured to the inner faces of the ends transversely thereof and lying flush with the upper edge of said side, other beads secured to the inner faces of the ends between the first-mentioned beads and the upper edges of the ends and spaced from said edges and from the first-mentioned beads, a bread-board disposed with its edges slidably engaged in the spaces between the first and second beads and movable into and out of position to close the body portion, and a pan-rack disposed with its ends slidably disposed upon the upper edges of the second beads.

2. A dough-raiser comprising a hollow body portion open at its top and having an opening in its bottom, a metallic lining disposed within the body portion and spaced from the ends and from the bottom thereof, a plate having a continuous depending flange at its edge disposed with its flange resting upon the bottom and encircling the opening thereof, said plate being spaced from the bottom and from the lining and having a plurality of perforations therethrough, a heating apparatus disposed beneath the opening and arranged to discharge its heat therethrough against the plate, and a closure for the body portion.

In testimony whereof I affix my signature in presence of two witnesses.

WILHELMIENE A. HECKEL.

Witnesses:
    FREDERICK COOK,
    H. B. MCCRAY.